United States Patent [19]

Marangoni

[11] 4,036,677
[45] July 19, 1977

[54] MACHINE FOR TREATING WORN OUT PNEUMATIC TIRES AND FOR APPLYING A PRE-MOLDED TREAD RING

[76] Inventor: Carlo Marangoni, Via Bellavista 22, Rovereto, Trento, Italy

[21] Appl. No.: 577,111

[22] Filed: May 13, 1975

[30] Foreign Application Priority Data

May 14, 1974 Italy .................................. 22672/74

[51] Int. Cl.² .................... B29H 17/37; B29H 17/38; B29H 21/01; B29H 21/08
[52] U.S. Cl. .......................... 156/394; 51/DIG. 33; 156/96; 156/126; 156/153; 157/13
[58] Field of Search ......................... 156/94–96, 156/98, 110 R, 126, 127, 128 R, 129, 133, 153, 394 R, 394 FM, 405; 51/5 C, DIG. 33, 273, 103 R, 105 R, 106 R; 157/13

[56] References Cited

U.S. PATENT DOCUMENTS

| | | | |
|---|---|---|---|
| 2,674,309 | 4/1954 | Bigelow | 51/5 C |
| 2,878,857 | 3/1959 | Smith et al. | 156/394 |
| 2,937,676 | 5/1960 | Smyser | 157/13 |
| 3,219,510 | 11/1965 | Frazier | 156/127 |
| 3,277,944 | 10/1966 | Curry | 157/13 |
| 3,426,828 | 2/1969 | Neilsen | 51/DIG. 33 |
| 3,561,908 | 2/1971 | Reinfeld | 51/5 C |
| 3,965,959 | 6/1976 | Weir | 157/13 |
| B 329,612 | 1/1975 | Edler | 156/394 |

*Primary Examiner*—Douglas J. Drummond
*Assistant Examiner*—John E. Kittle
*Attorney, Agent, or Firm*—Michael J. Striker

[57] ABSTRACT

A machine for retreading worn-out pneumatic tires comprises a chuck which is adapted to support a tire to be retreaded, an arrangement for rotating the tire, a peeling arrangement for removing the worn-out tread, a finishing arrangement for preparing the surface of the carcass for application of a new tread ring thereto, an arrangement for expanding the new ring and positioning the same on the carcass, and an arrangement for pressing the positioned tread ring against the tire, all of the arrangements being mounted on a common support with said chuck either axially or radially of the same for selective sequential movement toward and away from the tire to be retreaded.

1 Claim, 16 Drawing Figures

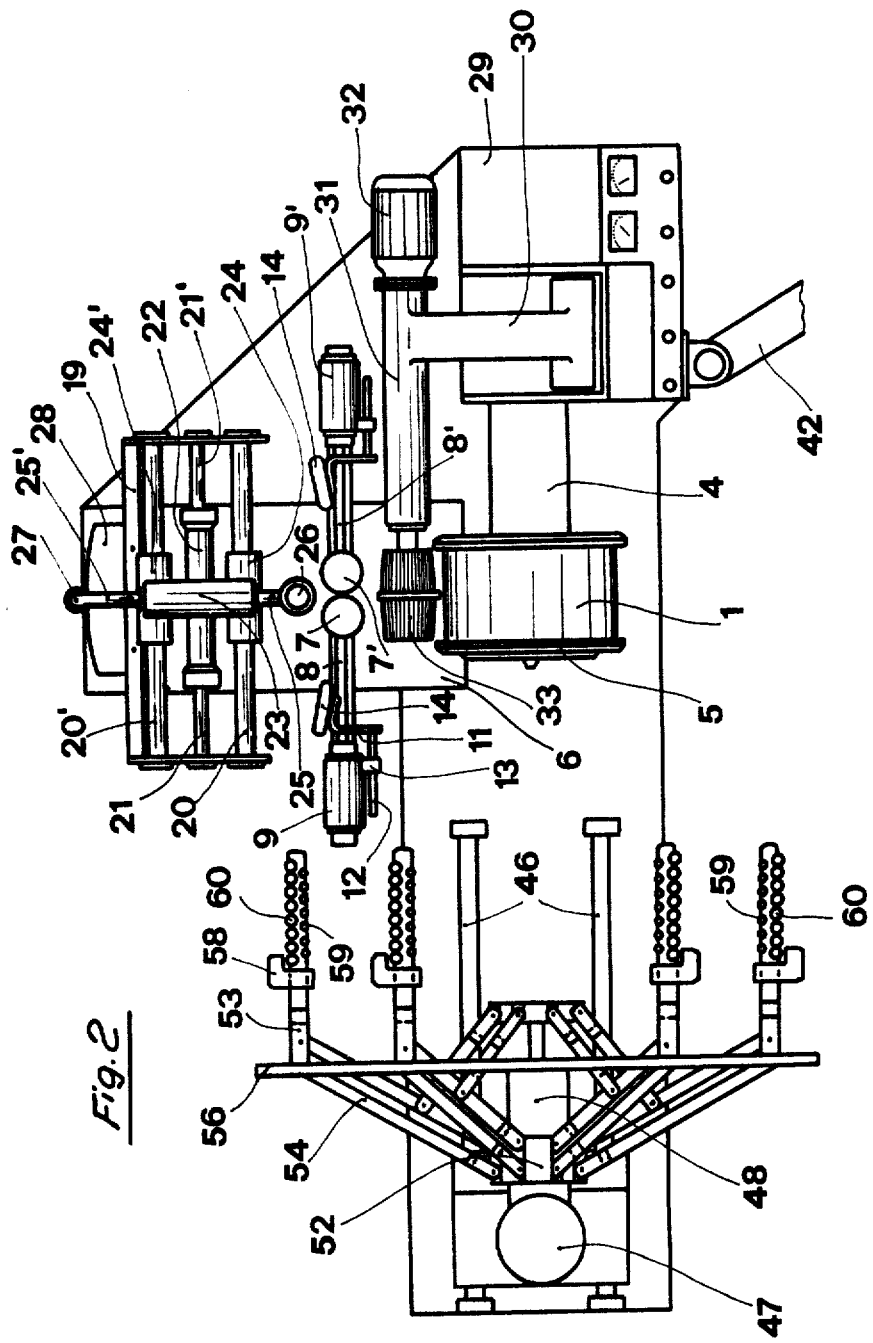

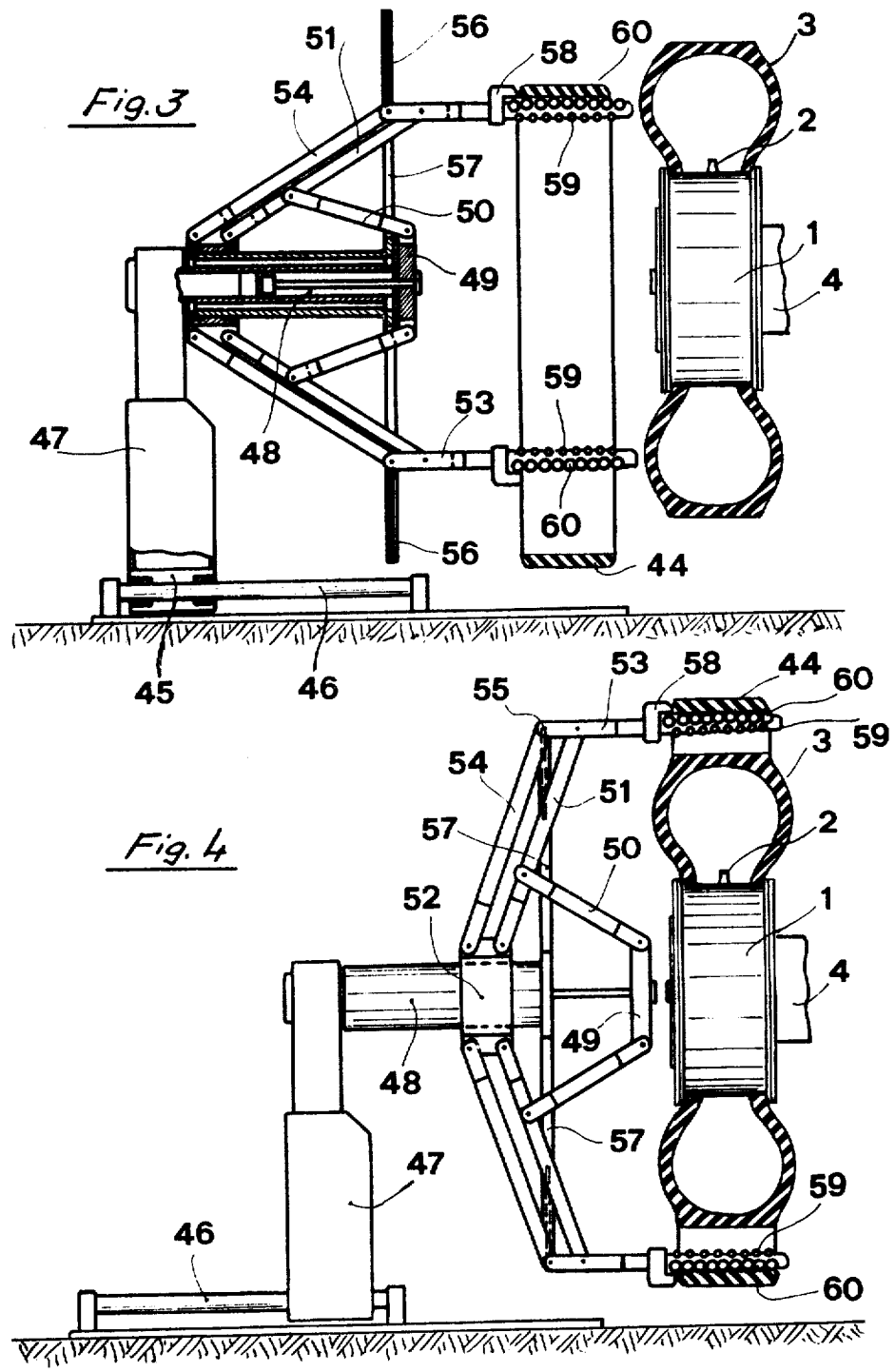

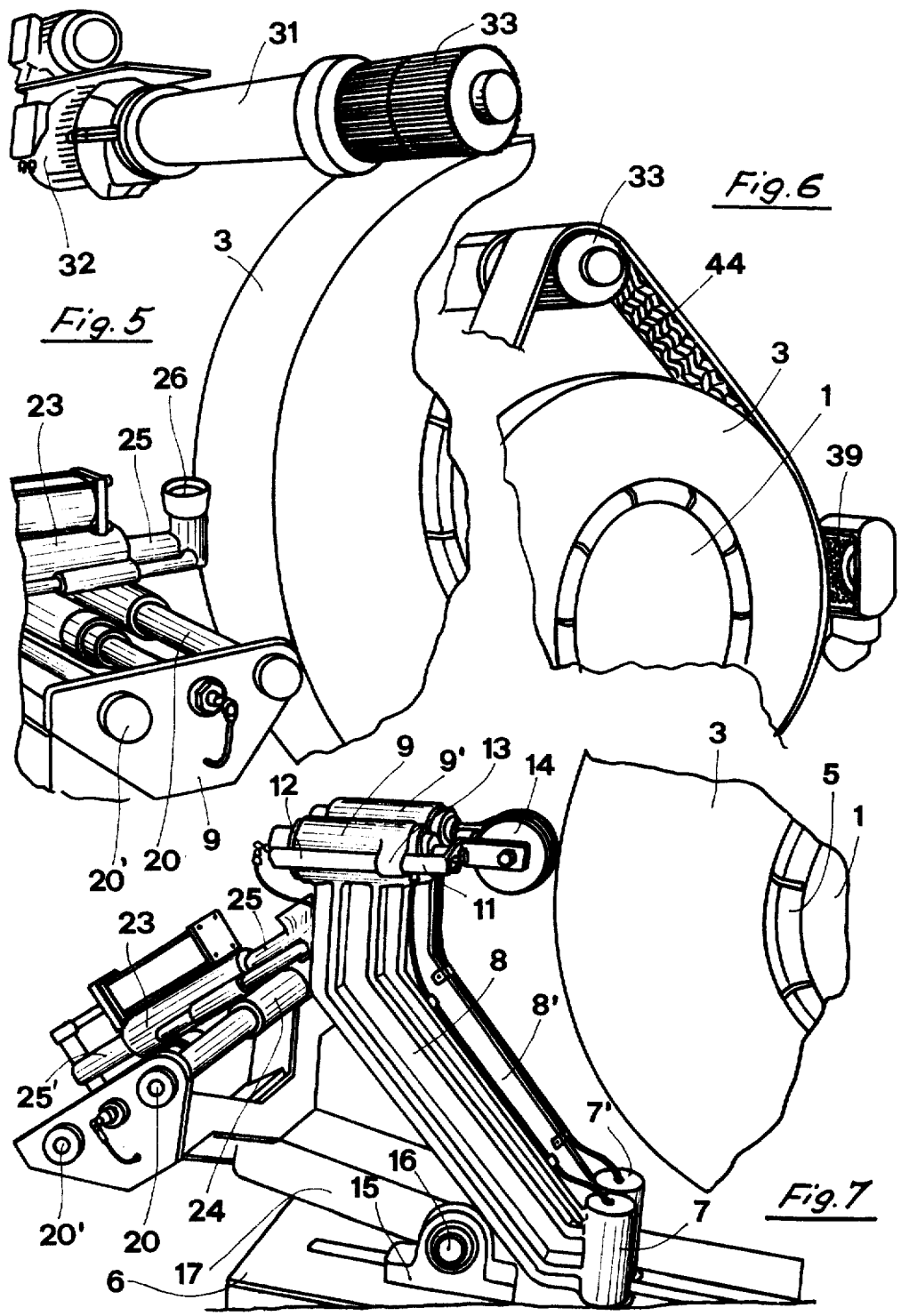

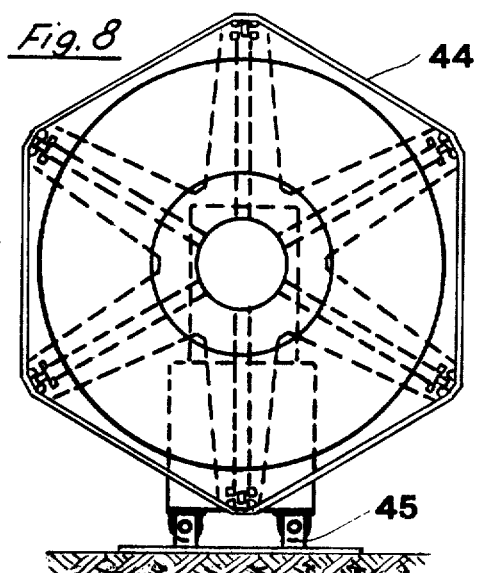
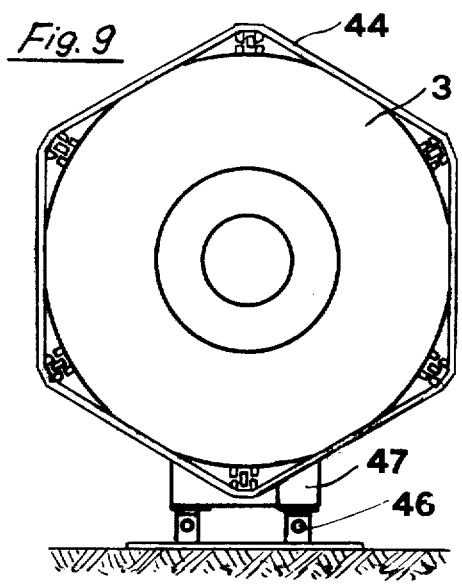
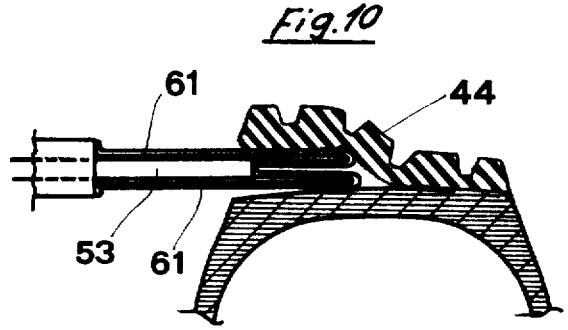
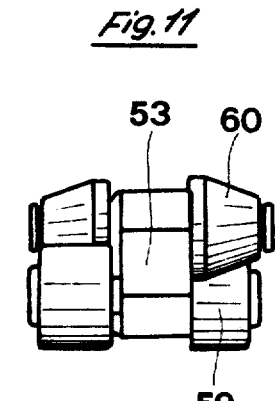
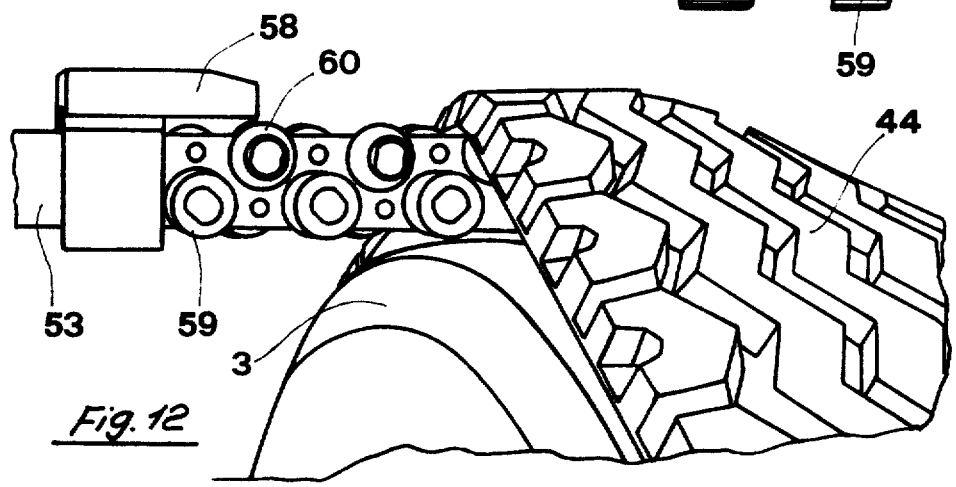

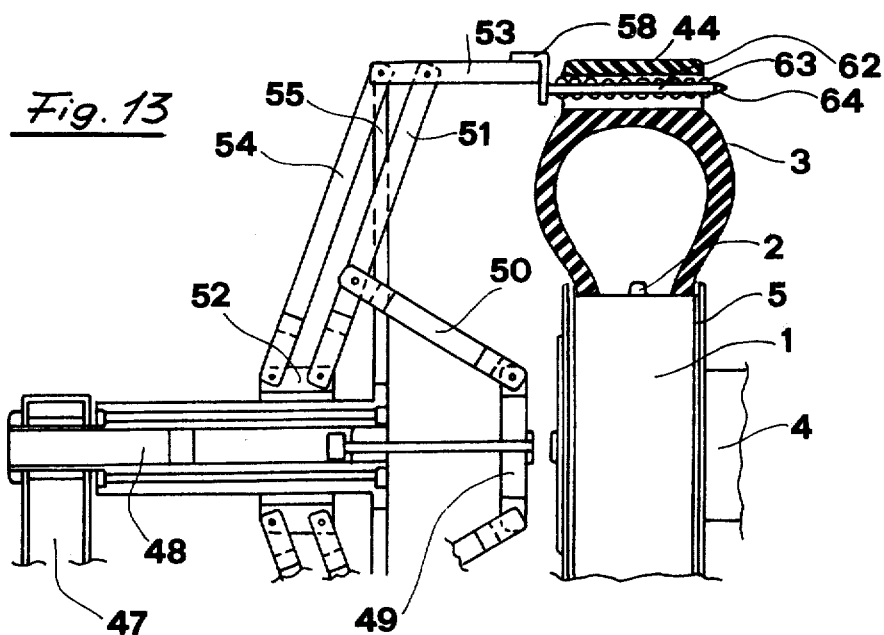
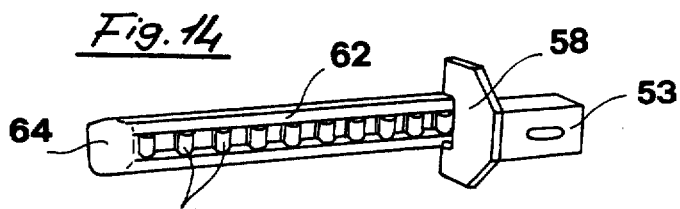
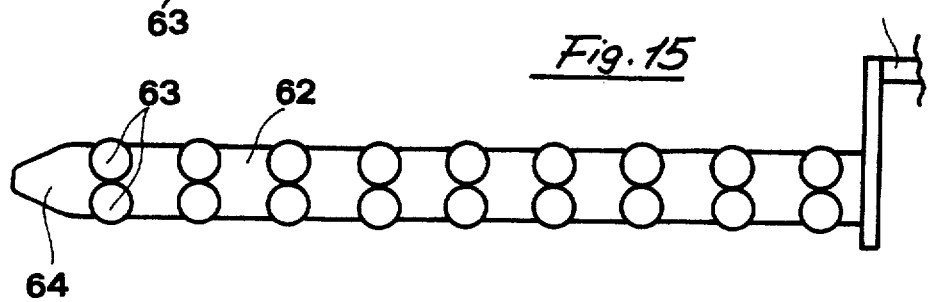
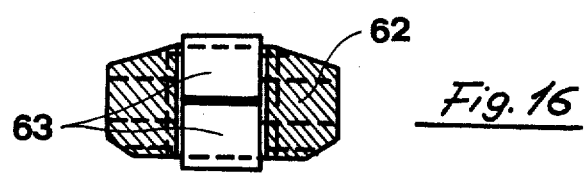

MACHINE FOR TREATING WORN OUT PNEUMATIC TIRES AND FOR APPLYING A PRE-MOLDED TREAD RING

This invention relates to a machine having multiple functions, particularly designed for preliminarily treating worn-out pneumatic tires and for subsequently applying premolded tread rings to the treated tires.

It is well known to retread pneumatic tires having worn-out treads but the carcasses of which are still in good condition, especially if the tires have large dimensions, by the application of new tread rings to their perimetral portions.

More in detail, the portion of the pneumatic tire whereat the worn-out tread was formed is removed and a pre-molded tread band is glued to the remainder of the tire by means of a suitable adhesive. The above-mentioned operation requires at present the use of a multitude of machines with attendant transfers of the pneumatic tire and tread band between the machines and a consequent high demand for the production time and expenditures.

It is, therefore, an object of this invention to provide a machine capable of performing the entire retreading operation without removing the pneumatic tire from its original position for the subsequent treatments until after the tire is provided with the new tread ring.

More particularly, it is the object of this invention to provide a machine capable of performing, automatically and in successive sequence, the peeling of the worn-out tread and the automatic application of the new pre-molded tread ring to the thus peeled pneumatic tire. These and still further objects are attained by the machine having multiple functions for retreading pneumatic tires according to the present invention, which includes in its general aspects an expansible self-centering chuck on which there is mounted, preferably with the aid of a small-sized lifting platform, the pneumatic tire to be treated.

On both sides of the expansible self-centering chuck, there are disposed an apparatus for peeling the worn-out tread band and a device for the finishing treatment of the peeled surface, respectively.

The peeling apparatus includes a frame, supported by a rod, journalled at its lower end and laterally articulated to a double acting cylinder. On the frame, there is mounted a cylinder which may extend radially to the expansion self-centering chuck following the rotation of the frame.

The aforesaid cylinder is provided at the end of its piston rod with a gouge which displaces parallel thereto, whilst the motion of the piston rod is controlled by a proper template, shaped according to the curve delimiting the peripheral portion of the carcass of a pneumatic tire.

Between the expansion self-centering chuck and the gouge carrying cylinder there are disposed two inclined arms, journalled at their lower ends so as to selectively assume parallel and orthogonal positions relative to the axis of the self-centering chuck. Each of the arms is provided at its upper end with a roller which is mounted on the piston rod of a cylinder. In practice, after the gouge has carried out the rough peeling of the pneumatic tire, it is tilted rearwardly away from the tire, so that its support frame and the roller carrying arms extend orthogonally to the axis of the self-centering chuck. During the use of the gouge, the roller carrying arms are turned outwardly through 90° so as not to interfere with the motion of the gouge.

The device performing the finishing treatment of the peeled surface includes a vertical column adapted to be rotated about its own axis via a proper handle bar.

The column supports a motor actuating two brushes having metallic bristles, adapted to effect a finishing treatment of the peeled surface of the pneumatic tire.

In front of the self-centering chuck there is placed an expanding device with three or more arms mounted on articulated parallelograms providing for suitable expansion of the new tread ring to be placed on the pneumatic tire. In particular, such expanding device consists essentially of an upright for supporting a horizontal cylinder the shank of which carries a disc, orthogonal to the shank. To the aforementioned disc, there are connected via a system of suitably articulated rods, three or more horizontal arms disposed of angularly equidistant points of a circumference.

The arms carry adjustable shoulders for the centering of the tread ring and are provided with rollers adapted to support the tread ring and projecting from the sides of the arms so as to facilitate the slipping of the arms on the inner portion of the tread ring, when the latter is partially glued to the pneumatic tire.

The expanding device slides over guides so as to automatically or manually transfer the tread ring to a position around the pneumatic tire.

The pneumatic tire which is clamped on the self-centering chuck is set in rotation by a driving roller mounted at the end of a shaft which is capable of displacing parallel to itself.

These and further characteristic features of a functional and constructional nature of the machine for the treatment and the application of tread rings on worn-out pneumatic tires according to this invention will be better understood from the following detailed description, taken in conjunction with the accompanying drawings illustrating a preferred but non-limiting embodiment of the invention, in which:

FIG. 2 represents in a schematic top view the machine of this invention as illustrated in FIG. 1;

FIGS. 3 and 4 show in schematic views the expanding unit in the phases of picking up the tread ring and its placing on the pneumatic tire, respectively;

FIG. 5 represent in a perspective schematic view a detail of the arrangement for peeling the pneumatic tire located at the worn-out tread;

FIG. 6 shows in a schematic view the phase of brushing the inner surface of the new tread ring to be applied on the pneumatic tire;

FIG. 7 represents in a schematic form the pressing operation of the new tread ring on the pneumatic tire;

FIGS. 8 and 9 show in a schematic form two positions of the tread ring mounted on the expanding unit relative to the pneumatic tire to be retreaded;

FIG. 10 represents in a schematic form the structure of the arms of the expanding unit;

FIG. 11 shows a perspective front view of one of the arms illustrated in FIG. 10, provided with sliding rollers;

FIG. 12 represents in a schematic form the slip-off phase of the arm from beneath the tread ring mounted on the pneumatic tire;

FIG. 13 shows in a schematic form another embodiment form of the arms of the expanding unit;

FIG. 14 represents in a perspective schematic form the sliding arm of the expanding unit;

FIG. 15 shows such sliding arm in a schematic side view; and

FIG. 16 represents the cross section of the arm illustrated in FIGS. 14 and 15.

Figure 1:
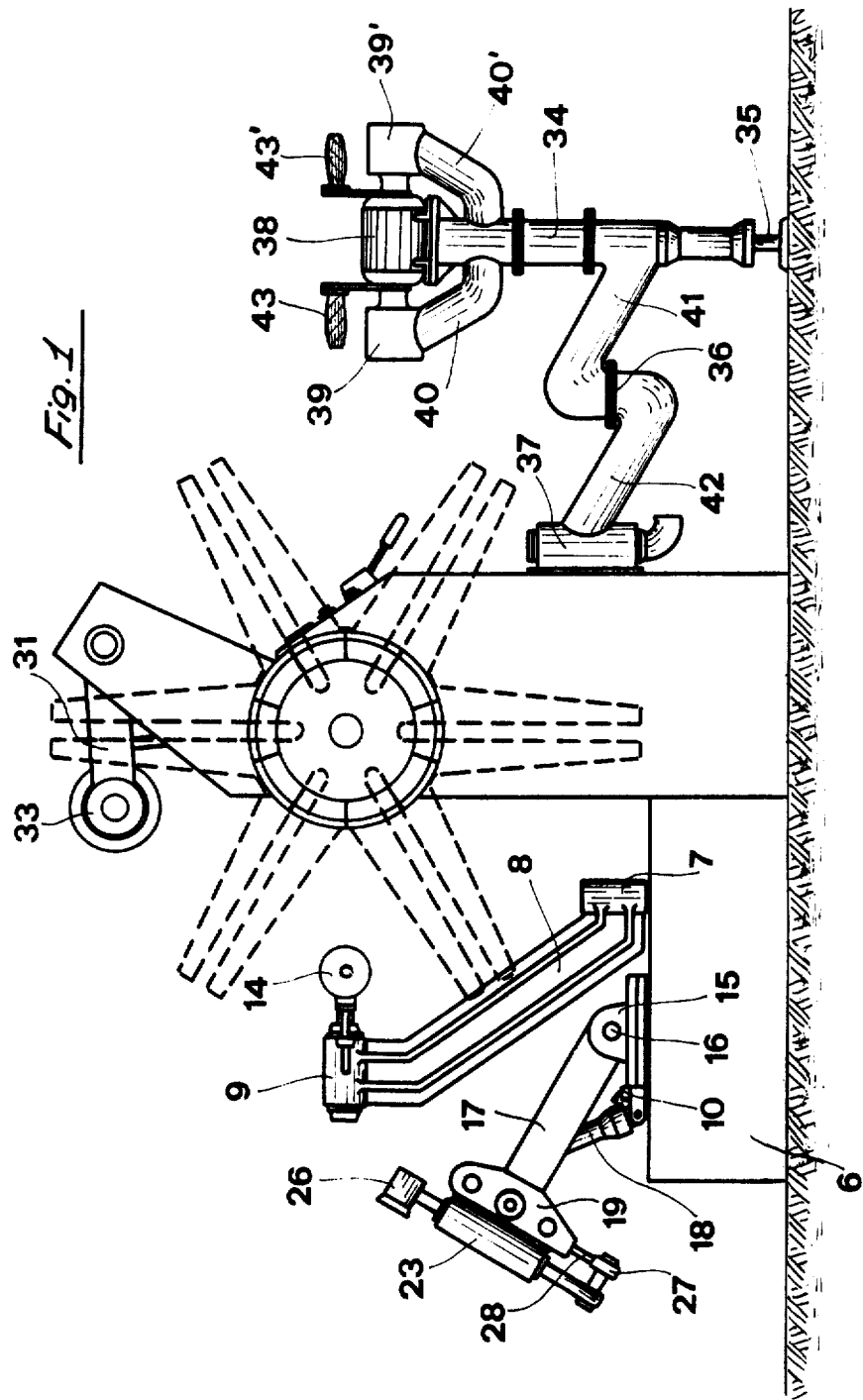
FIG. 1 shows in a schematic front view the machine of this invention for the treatment and application of tread rings on worn-out pneumatic tires.

Referring now particularly to the reference numerals in the various figures of the accompanying drawings, the machine according to the present invention includes an expansible self-centering chuck 1, consisting of a plurality of sectors, which may move in radial directions and provided with a valve 2 (see FIGS. 3 and 4) for the inflation of the pneumatic tire 3 to be treated after the latter is mounted on the self-centering chuck 1 preferably with the aid of a non-illustrated conventional small-sized platform, which may be lifted by pedal control.

The expansible self-centering chuck 1 is mounted on a shaft 4 for rotation relative thereto or therewith and has peripheral beads 5, adapted to embrace the edges of the pneumatic tire 3.

Alongside the self-centering chuck 1, as seen particularly in FIGS. 1 and 3 there is arranged a platform 6 for supporting a pair of cylindrical structures 7 and 7′, arranged side-by-side to each other which may rotate about their own vertical axes due to the action of an automatically controlled hydraulic circuit. To the cylindrical structures 7 and 7′, there are connected two arms 8 and 8′, respectively, being suitably inclined relative to the vertical, which arms 8 and 8′ serve as support means for two double acting cylinders 9 and 9′.

To the piston rods of the aforesaid double acting cylinders 9 and 9′, there are affixed brackets 11, each supported via a bar 12 by a guide 13 integral with the respective cylinder 9 or 9′, a pressing roller 14 being journalled on each of the brackets 11. On the platform 6, there is further fastened a bearing block 15 on which there is supported a column 17 for tilting about a pin 16. Such column 17 is also articulated to the platform 6 via a double acting cylinder 18, (compare FIG. 1), adapted to cause the column to move between a vertical and an inclined position, diverging from the aforesaid arms 8 and 8′.

A frame 19 for supporting a pair of parallel guides 20 and 20′ and rods 21 and 21′ of a cylinder 22 which are intermediate and parallel to the guides 20 and 20′ is mounted at the top of the column 17.

The cylinder 22 is parallel to the guides 20 and 20′ (see FIG. 2), and the rods 21 and 21′ are extensions of each other in opposite directions from the cylinder 22. Orthogonally to the cylinder 22 and the guides 20 and 20′, there is disposed a second double-acting cylinder 23, fastened to the body of the cylinder 22, and two slides 24 and 24′, sliding along the guides 20 and 20′.

The cylinder 23 has two piston rods 25 and 25′ which carry a gouge 26 and a wheel 27, respectively, which latter engages with the profile of an interchangeable template 28, fastened to the frame 19.

In particular, the piston of the cylinder 23 displaces the rod 25 carrying the gouge 26 so that the latter, following the alternating translatory motion of the body of the cylinder 22, moves in an arcuate trajectory, defined by the curved profile of the template 28 with which the wheel 27 is in contact.

The translatory speed of the cylinder 22 and therefore of the piston of the cylinder 23 can be conveniently varied as required for a tire 3 of certain dimensions. It should be stressed here that, during the peeling operation of the worn-out tread of the pneumatic tire 3 carried out by the gouge 26, the column 17 which supports the frame 19 is disposed vertically, whereas the two arms 8 and 8′ which support the rollers 14 are so rotated as to lie in the same vertical plane and to diverge from one another, as seen in FIG. 2. Once the peeling operation of the pneumatic tire 3 has been complete, the cylinder 18 draws the column 17 downwardly, thereby causing the tilting of the frame 19 with the consequent retraction of the gouge 26 from the tire 3.

The column 17 engages, in its maximum inclination position, a micro-switch 10 which controls the timed rotation of the two arms 8 and 8′ which thus assume the side-by-side positions in orthogonal planes to the axis of the self-centering chuck 1 as illustrated in FIGS. 1 and 7.

A structure 29 supports the self-centering chuck carrying shaft 4 as seen in FIG. 2. An arm 30, supporting a motor 32 and a bearing 31, in which there is mounted a driving roller 33, is attached to the structure 29.

The driving roller 33, by pressing on the peripheral portion of the pneumatic tire 3 as seen in FIG. 5, causes its rotation, thereby allowing the treatment of the pneumatic tire 3.

On the side opposite the platform 6 relative to the self-centering chuck 1, there is situated a hollow column 34 (compare FIG. 1), mounted on a base pin 35, which column 34 may be displaced at will, this being rendered possible by two couplings 36 and 37 the latter of which is supported at one side of the structure 29.

At the top of the hollow column 34, there is mounted a motor 38, provided with a through-shaft at the ends of which there are fixedly secured two brushes 39 and 39′, enclosed inside box-shaped bodies which are open on the forward positions. The box-shaped bodies communicate via the ducts 40 and 40′ with the hollow column 34, which, in turn, communicates with tubular bodies 41 and 42 to provide for discharge of the rubber particles removed by the brushes 39, 39′ from the surface of the pneumatic tire 3.

Such brushes 39, 39′ can be placed in contact with the rough peeled surface of the pneumatic tire 3 by suitably positioning the column 34 by means of handles 43 and 43′ to thereby perform a surface finishing or preparing treatment of the pneumatic tire 3.

The brushes 39 and 39′ may be further used to subject the inner face of a tread ring 44 to be applied on the pneumatic tire 3 to an identical finishing treatment, as seen in FIG. 6. This operation is in practice carried out prior to starting the treatment of the pneumatic tire 3 already fixed on the self-centering chuck 1 by spreading the ring 44 between the pneumatic tire 3 and the driving rollers 33.

To the inner face of the ring 44, there is further applied a layer of an adhesive, whereas to the treated surface of the pneumatic tire 3, there is applied, besides a similar layer of an adhesive, also a rubber sheet serving as a sub-layer.

The machine of this invention further includes an expanding unit mounted by means of suitable slides 45 on a pair of rails 46 arranged at the front of the self-centering chuck 1 and extending parallel to the axis thereof. The expanding unit, as seen particularly in FIGS. 3 and 4, consists essentially of an upright 47 which supports a horizontal cylinder 48, to the shank of which there is integrally connected a disc 49. Peripherally relative to the disc 49, there are journalled three or more rods 50, articulated in turn to as many rods 51 each of which is journalled at one end to a sleeve 52, which may slide along the body of the cylinder 48 referred to above.

The other end of the respective rod 51 is coupled with an expanding arm 53 an end of which is connected to the sleeve 52 by means of a second rod 54.

The pivots 55 which connect the expanding arms 53 to the rods 54 slide in a guide 56 formed at the ends of a plurality of rods 57 disposed radially to the head of the cylinder 48 and integral therewith.

The expanding arms 53 carry adjustable shoulders 58 for centering the tread ring 44 relative to the tire 3, and are provided at their ends designed to contact the ring 44 and at the two vertical surfaces with two parallel horizontal rows of rollers 59 and 60, suitably projecting from their sides and mounted for rotation about parallel axes. More in detail, the aforesaid expanding arms 53 carry cylindrical rollers 59 disposed on the lower parts of the two vertical surfaces, and conical rollers 60 disposed on the upper part of the two vertical surfaces.

Such particular configuration of the lower and upper rollers 59 and 60 achieves that profiles of the expanding arms 53 conform to the profile assumed by the ring 44, when it is stretched and superimposed upon the pneumatic tire 3 (FIGS. 8 and 9).

The configuration of the upper rollers 60 facilitates the slipping of the expanding arms 53 from underneath the ring 44, when the latter already at least partially adheres to the pneumatic tire 3 (FIG. 12). Alternatively (FIG. 10) the expanding arms 53 may be provided on the upper and lower parts with a pair of flexible blades 61, which may be slipped off to the side by retraction of the arms 53 relative to the shoulders 58.

According to another alternative form as schematically shown in FIGS. 13 through 16, the expanding arms 53 may each consist of a fork 62 supporting a plurality of pairs of cylindrical rollers 63.

The fork 62 is bevelled off on the sides and at its free end 64 so as not to have sharp edges in contact with the ring 44 to be applied to the pneumatic tire 3.

As formerly stated, the rollers 63 project from the surface of the fork 62 in order to ensure the slip-off of such fork 62 without causing displacement of the ring 44 and so that the tread ring 44 is properly sealed on the carcass of the tire 3. The ring 44, once arranged on the pneumatic tire 3, is finally pressed against the same by the action of the two pressing rollers 14.

From the foregoing specification and from perusal of the various Figures on the accompanying drawings, it is possible to easily see the function and the practical application of the machine according to this invention for retreading worn-out pneumatic tires. When constructing the machine of this invention, several changes and modifications as to shape, construction and dimensions may be introduced without departing from the very spirit and scope of this invention.

I claim:

1. A machine for retreading worn-out pneumatic tires comprising, in combination, a support; a chuck mounted on said support for rotation about an axis and operative for supporting a tire to be retreaded thereon; means for inflating the tire on said chuck; means for selectively rotating the tire on said chuck about said axis; means for peeling the worn-out tread from the tire to obtain a tire carcass, including a cutting element mounted on said support for displacement toward and away from the tire in a path along a plane normal to said axis; means for preparing the peeled outer peripheral surface of the carcass for application of a new annular tread thereto, including at least one brush mounted on said support across said chuck from said peeling means for displacement toward and away from the carcass substantially along said plane; means for expanding the new annular tread and for positioning the same on the prepared outer periphal surface of the carcass, including a plurality of expanding arms, means for mounting said expanding arms on said support axially of said chuck for simultaneous movement parallel to and radially of said axis, including rails located at one side of said plane and extending parallel to said axis, a carriage movable over said rails toward and away from said chuck, a cylindrical body mounted on said carriage and having a central axis coinciding with said axis, a sleeve mounted on said cylindrical body for axial displacement relative thereto, and first links articulated to said sleeve and to said expanding arms and forming a parallelogram linkage therewith, and means for sequentially moving said expanding arms relative to said support between a retraced position in which said expanding arms are located axially adjacent said chuck and axially spaced therefrom and at a radial distance from one another at which the new annlar tread can be placed onto said expanding arms in unstressed condition, a fully expanded position in which the new annular tread is fully expanded and positioned over the outer peripheral surface of the carcass with spacing therefrom, and a partially expanded position in which the inner surface of the new annular tread contacts the outer peripheral surface of the carcass between said expanding arms and adheres thereto, the adhesion of the surfaces permitting the return of said expanding arms toward said retracted position without entrainment of the new annular tread, including a cylinder-and-piston unit accommodated in said cylindrical body and having a shank extending axially outwardly of the latter, a disc-shaped body connected to the shank, and second links pivoted on said disc-shaped body and on said first links; and means for pressing the new annular tread against the outer peripheral surface of the carcass, including at least one pressing roller mounted on said support at said peeling means for displacement between a retracted position outside said path and an extended position in which said pressing roller contacts the outer surface of the new annular tread and presses the same against the carcass.

* * * * *